(12) United States Patent
Gupta et al.

(10) Patent No.: US 10,862,756 B2
(45) Date of Patent: Dec. 8, 2020

(54) SYSTEMS AND METHODS FOR INVENTORY DISCOVERY IN A NETWORK

(71) Applicant: Citrix Systems, Inc., Fort Lauderdale, FL (US)

(72) Inventors: Anup L. Gupta, Bangalore (IN); Praveen R. Dhanabalan, Bangalore (IN); Akshata Bhat, Bangalore (IN); Jaskirat Chauhan, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 289 days.

(21) Appl. No.: 15/928,160

(22) Filed: Mar. 22, 2018

(65) Prior Publication Data

US 2019/0296979 A1 Sep. 26, 2019

(51) Int. Cl.
*H04L 12/24* (2006.01)
*H04L 29/08* (2006.01)
*G06N 3/08* (2006.01)
*G06N 3/04* (2006.01)

(52) U.S. Cl.
CPC ............... *H04L 41/12* (2013.01); *G06N 3/04* (2013.01); *G06N 3/08* (2013.01); *H04L 67/12* (2013.01)

(58) Field of Classification Search
CPC ...................... H04L 63/0876; H04W 12/00512
See application file for complete search history.

(56) References Cited

U.S. PATENT DOCUMENTS

| 2003/0078900 A1* | 4/2003 | Dool | G06F 3/0481 |
| | | | 706/18 |
| 2017/0262523 A1* | 9/2017 | Epstein | H04L 67/1095 |
| 2017/0300976 A1* | 10/2017 | Dogruoz | G06Q 30/0241 |
| 2018/0270229 A1* | 9/2018 | Zhang | H04W 12/06 |

OTHER PUBLICATIONS

Canedo et al, Using machine learning to secure IoT systems, Dec. 2016 https://ieeexplore.ieee.org/stamp/stamp.jsp?tp=&arnumber=7906930&tag=1 (Year: 2016).*

(Continued)

*Primary Examiner* — William G Trost, IV
*Assistant Examiner* — Christopher P Cadorna
(74) *Attorney, Agent, or Firm* — Fox Rothschild LLP; Robert J. Sacco; Carol E. Thorstad-Forsyth

(57) ABSTRACT

Systems and methods for identifying a new device in an internet of things (IoT) network comprising a plurality of devices. The method includes, by a processor: detecting that a new device has been added to the IoT network; receiving identification data corresponding to the new device; determining a first device identification using a deep learning algorithm; determining a second device identification using a clustering algorithm; determining a third device identification based on a reference table; determining a fourth device identification by analyzing one or more values included in the identification data. The method further includes selecting, at least one of the first device identification, the second device identification, the third device identification, or the fourth device identification, as a final device identification by performing a weighted selection.

22 Claims, 4 Drawing Sheets

(56) References Cited

OTHER PUBLICATIONS

Miettinen et al., IoT Sentinel: Automated Device-Type Identification for Security Enforcement in IoT, Jun. 2017 https://ieeexplore.ieee.org/document/7980167 (Year: 2017).*

Mahalle et al, Object Classification based Context Management for Identity Management in Internet of Things, 2013, htttps://www.semanticscholar.org/paper/Object-Classification-based-Context-Management-for-Mahalle-Prasad/c953c15b43bc2e86031b8e77fc4f56585b6245ed (Year: 2013).*

* cited by examiner

SYSTEMS AND METHODS FOR INVENTORY DISCOVERY IN A NETWORK

BACKGROUND

Statement of the Technical Field

The present application generally relates to inventory discovery of devices in a network of internet of things (IoT). In particular, the present application relates to systems and methods for discovery and identification of devices in an IoT network using a combination of machine learning and rule based pattern matching.

Description of the Related Art

Internet of Things (IoT) refers to an interconnection of devices connected over a network (such as the Internet), and that maybe monitored or controlled from remote servers. Almost any device comprising a communication unit may be connected over the IoT. As such, IoT is based on the idea that everyday objects, not just computers and computer networks, can be readable, recognizable, locatable, addressable, and controllable via an IoT communications network. Such devices include, among others, smartphones, smartwatches, TVs and other multimedia devices, game consoles, home appliances, and various sensors/actuators such as thermostats and intelligent lighting systems.

However, developing and maintaining an IoT network knowledge and identification of each device in the network which is practically cumbersome because of the practically unlimited number of devices that need to be connected to either private networks or the Internet at large, and be monitored or controlled from remote servers. Lack of such knowledge leads to several challenges. For example, initial registration and provisioning of a device over the IoT efficiently and with minimal user intervention becomes a challenge. Typically, the devices are registered manually over the IoT that consumes a lot of time and effort, especially for a typical IoT user who is not experienced in network administration. Furthermore, devices may or may not have user-accessible input/output capability. For example, a device may be an embedded sensor inside of a product such as a refrigerator or washing machine. Such a device may not have a mouse, keyboard, display or any other type of user-accessible interface by which a person can digitally interact with the device for manual registration. Moreover, for a device to connect to other devices over a network, the device generally needs to be provisioned. Provisioning a device includes programming the device to specify how it is to communicate over the network and possibly specifying what sort of data is to have access to, what services the device can access, etc. Provisioning a device in the context of the IoT network may be problematic because of the large number of devices on the IoT network and because the device may lack a human-accessible input/output capability. This problem is exacerbated because in a typical IoT network, devices may be added or removed from the network frequently.

Yet another challenge faced during development of the IoT network is related to privacy and security because any malware, rootkit or advanced persistent threat can hide in any of the connected devices and may use the device as a platform from which to mount attacks on other nodes on the Internet. As such, for security it is very useful to know the identity (i.e., the type, make and model) of each connected device in order to efficiently monitor and make appropriate decisions based on the device identity. Again, the ad-hoc and non-coherent nature of IoT deployment (i.e., includes a large number of devices that may be added or removed at any time), makes device identification cumbersome and inefficient.

Current methods for device identification include either rule based pattern matching or statistical methods (supervised and/or unsupervised machine learning). However, rule-based classification systems to classify discrete sets of data are often difficult and expensive to maintain, and often insufficient for tasks involving large, varying, and/or complex data sets. As such, rule based pattern matching is ineffective and inaccurate in an ad-hoc and dynamic IoT environment with a multitude of ever-changing parameters since. While using statistical machine learning may provide accuracy, the high number of parameters makes feature selection computationally intensive and tedious. For example, current methods of device identification typically work with supervised data that has been tested and classified based on a trusted training set of known data in a controlled environment and does not provide a solution to analyzing the plethora of unsupervised data that cannot be easily labelled. Moreover, training a model to achieve the desired accuracy (even for a good feature set) is time consuming for methods relying solely on statistical learning.

SUMMARY

Implementing systems and methods for identifying a new device in an internet of things (IoT) network comprising a plurality of devices. The method may include, by a processor: detecting that a new device has been added to the IoT network; receiving identification data corresponding to the new device. The method also includes analyzing the received identification data using a deep learning algorithm to determine a first device identification and using a clustering algorithm to determine a second device identification. The method may also include determining a third device identification based on a reference table and determining a fourth device identification by analyzing one or more values included in the identification data. The method may further includes selecting, at least one of the first device identification, the second device identification, the third device identification, or the fourth device identification, as a final device identification by performing a weighted selection.

In some scenarios, determining the first device identification by analyzing the identification data using the deep learning algorithm may include training a deep neural network using a training data set that comprises information extracted from data packets received or published by the plurality of devices, extracting information corresponding to data packets received or published by the new device from the identification data, and determining the first device identification by inputting the information corresponding to data packets received or published by the new device into the trained deep neural network. Optionally, the information included in the training data set may include payload size information corresponding to the data packets received or published by the plurality of devices. Alternatively and/or additionally, the training data set may include one or more subsets of training data corresponding to one or more messaging protocols used by the plurality of IoT devices for receiving or publishing data packets.

In one or more scenarios, determining the second device identification by analyzing the identification data using the clustering algorithm may include clustering the plurality of devices into one or more clusters such that devices included in each of the one or more clusters have a plurality of similar features. Determining the second device identification by analyzing the identification data using the clustering algorithm may further include extracting from the identification data, one or more features corresponding to the new device, and using the extracted one or more features to assign the new device to at least one of the one or more clusters. Optionally, clustering the plurality of devices into one or more clusters may include receiving (e.g., from a user) device identification corresponding to at least one device in each of the one or more cluster, and using the received device identification to label that cluster. In one or more scenarios, clustering the plurality of devices into one or more clusters may also include performing the clustering by analyzing a plurality of features corresponding to the plurality of devices. Examples of the features may include, for example and without limitation, a type of network connection supported by each device, a type of communications protocol supported by each device, a manufacturer of each device, one or more capabilities of each device, and/or types of data transmitted by each device.

In certain scenarios, the reference table may include information about one or more protocol parameters corresponding to a plurality of IoT devices. In such a scenario, determining the third device identification based on the reference table may include extracting at least one protocol parameter corresponding to the new device for finding a match in the reference table.

In some scenarios, determining the fourth device identification by analyzing one or more values included in the identification data may include parsing information included in a plurality of data packets received or published by the new device to determine at least one measurement unit included corresponding to the new device, and analyzing the at least one measurement unit to determine the fourth device identification.

In at least one scenario, selecting the final device identification by performing the weighted selection may include assigning a first weight to the deep learning algorithm, a second weight to the clustering algorithm, a third weight to the reference table, and a fourth weight to the analyzing of the one or more values included in the identification data. The selecting step may further include initializing, probability vectors corresponding to each of the first device identification, the second device identification, the third device identification, and the fourth device identification, and updating the probability vectors to generate updated vectors corresponding to each of the first device identification, the second device identification, the third device identification, and the fourth device identification. The final device identification may then be selected as one of the first device identification, the second device identification, the third device identification, and the fourth device identification by comparing the values of the updated vectors corresponding to each of the first device identification, the second device identification, the third device identification, and the fourth device identification. Optionally, the method may also include updating the first weight, the second weight, the third weight, and the fourth weight based on the final device identification.

BRIEF DESCRIPTION OF THE DRAWINGS

Embodiments will be described with reference to the following drawing figures, in which like numerals represent like items throughout the figures.

DETAILED DESCRIPTION

Figure 1:
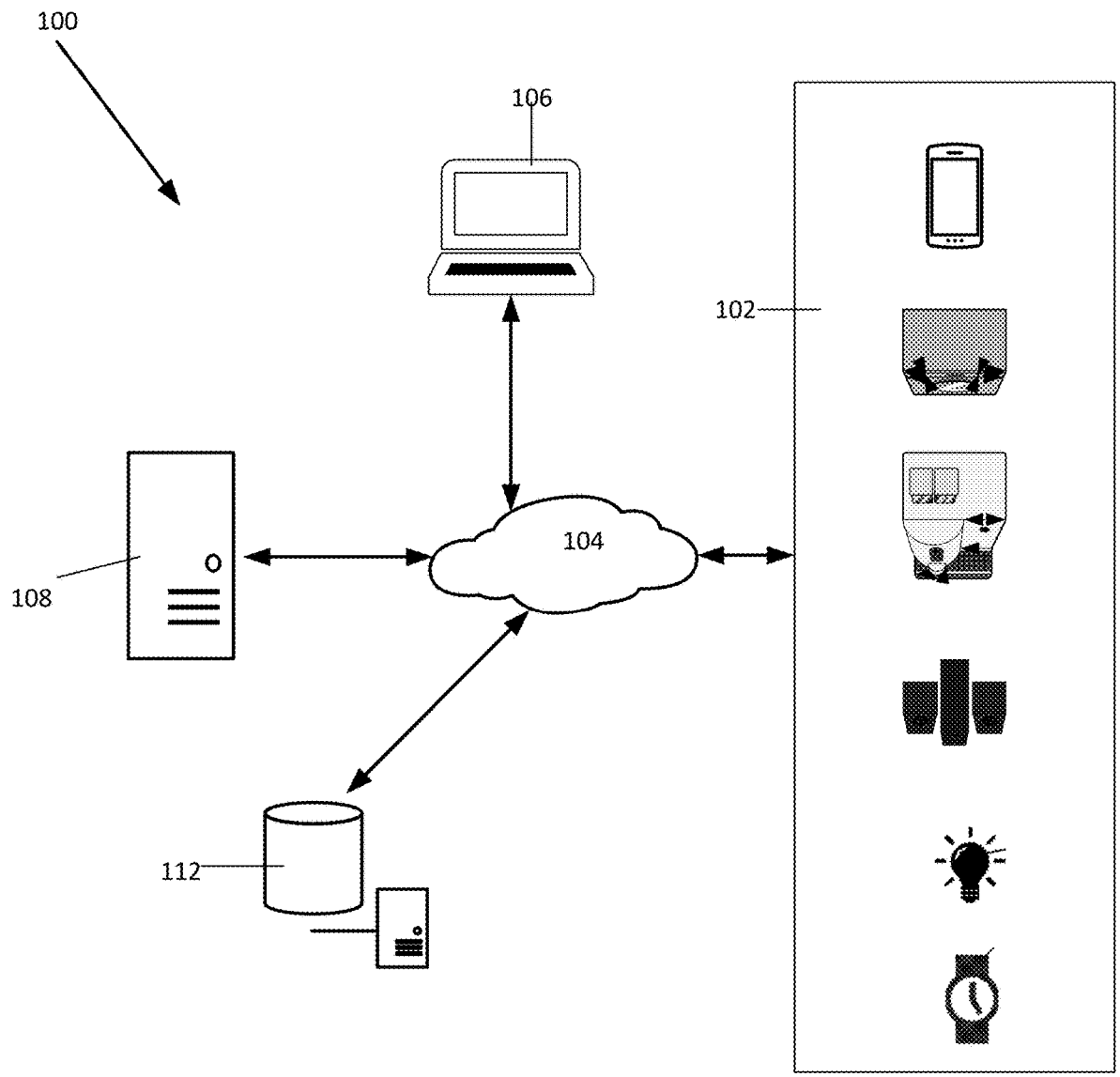
FIG. 1 illustrates an exemplary IoT network that may be used in accordance with one or more illustrative aspects described herein.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As used herein, the term "Internet of Things (IoT) device" or "device" is used to refer to any object (e.g., an appliance, a sensor, computing device, etc.) that has an addressable interface (e.g., an Internet protocol (IP) address, a Bluetooth identifier, a near-field communication (NFC), etc.) and that can transmit information to one or more other devices over a wired or wireless connection (i.e., a communication interface). An IoT device may have a passive communication interface, such as a quick response (QR) code, a radio-frequency identification (RFID) tag, an NFC tag, an infrared tag, or the like ("passive IoT device"), or an active communication interface, such as a modem, a transceiver, a transmitter-receiver, or the like ("active IoT device"). An IoT device can have a particular set of attributes (e.g., characteristics of the device, features of the device, variables corresponding to the device such as a device state or status (e.g., whether the IoT device is on or off, open or closed, idle or active, available for task execution or busy, and so on), or the like), a cooling or heating function, a sensing function, monitoring or recording function, an administering function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, appliances (such as refrigerators, toasters, ovens, microwaves, freezers, dishwashers, dishes, hand tools, clothes washers, clothes dryers, furnaces, air conditioners, thermostats, televisions, vacuum cleaners, sprinklers, electricity meters, gas meters, or the like); health monitoring devices (such as, glucometers, thermometers, pulse rate monitors, smart watches, or the like); smart tags (e.g., pet ID tags, keyfob RF tags, etc.), environmental monitors (e.g., thermostats, rain sensors, motion detectors, window/door sensors, garage door sensors, etc.); speakers; smart sensors; vehicle accessories; security systems, etc., so long as the devices are equipped with a communication interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Referring now to FIG. 1, a block diagram illustrating a system architecture including an internet of things (IoT) environment in which the embodiments described herein may be implemented is shown. Computer software, hardware, and networks may be utilized in a variety of different system environments, including standalone, networked, remote-access (aka, remote desktop), virtualized, and/or cloud-based environments, among others.

As shown in FIG. 1, the system 100 includes a group of one or more IoT devices 102, in communication with the network 104. At least some of the IoT devices 102 may also be connected to a user device 106 and an IoT server 108 via the network 104. The system 100 may also include a device identification engine 110 and a data store 112.

IoT devices 102 may generally be devices that are readable, recognizable, locatable, addressable, and controllable via an IoT communications network, such as an ad-hoc system. One or more of IoT devices 102 may be capable of directly generating and/or receiving communications (e.g., active IoT devices). However, it is further contemplated that one or more other devices, such as another IoT device, may generate and/or receive communications on behalf of an IoT device (e.g., passive IoT devices).

The IoT devices 102 may include any number of different types of devices, grouped in various combinations. The IoT devices 102 may include components such as, without limitation, sensors, radio frequency identification (RFID) technology, global positioning system technology, mechanisms for real-time acquisition of data, passive or interactive interface, mechanisms of outputting and/or inputting sound, light, heat, electricity, mechanical force, chemical presence, biological presence, location, time, identity, other information, or the like. In certain embodiments, the IoT devices 102 may be equipped with various types of sensors to collect information about themselves and their surroundings and provide the collected information to the user device 106, other IoT devices 102, and/or the IoT server 108. Some of the IoT devices 102 may perform a specified function in response to control commands sent from the user device 106, other IoT devices 102, and/or the IoT server 108.

IoT devices 102 may implement one or more application-layer communication protocols. Examples include constrained application protocol (CoAP), message queue telemetry transport (MQTT), OPC UA, HTTP, and the like for implementing a respective messaging protocol. IoT devices 102 may also implement lower-layers communication protocols which may implement layers of a communication protocol stack lower than the application-layer. Example layers implemented may include one or more of the physical, data link, network, transport, session, internet, and presentation protocols. Example protocols implemented include one or more of: Ethernet, Internet Protocol, Transport Control Protocol (TCP), protocols for the 802.11 standard (e.g., PHY, Medium Access Control, Logical Link Control, and the like), and the like.

IoT devices 102 can include one or more passive IoT devices (in contrast to active IoT devices) that can be coupled to or otherwise be made part of system 100. Passive IoT devices may include barcoded devices, Bluetooth devices, radio frequency (RF) devices, RFID tagged devices, infrared (IR) devices, NFC tagged devices, or any other suitable device that can provide its identifier and potentially attributes to another device when queried over a short range interface. Active IoT devices may detect, store, communicate, act on, and/or the like, changes in attributes of passive IoT devices. Examples of passive IoT devices include a coffee cup and a television remote control that each has an RFID tag, barcode, and/or other passive communication interface. An active IoT device, such as a refrigerator, may be equipped with a scanner or reader that can read the RFID tag or barcode to detect when passive IoT devices have been added or removed therefrom, are within range of the active IoT device, and/or are otherwise associated with the IoT device. In response, a supervisor device may optionally receive one or more signals that relate to the activities detected at the IoT device. Although the foregoing describes passive IoT devices as having some form of RFID tag or barcode communication interface, these are merely examples.

The network 104 may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MQTT-sensor (MQTT-S) communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 104 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MQTT-S, CoAP, REST API, XMPP, or another suitable wired and/or wireless communication method. The network 104 may include one or more switches and/or routers, including wireless routers that connect the wireless communication channels with other wired networks (e.g., the Internet). The data communicated in the network 104 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the IOT devices 102, physical hubs, cloud sever communication, or gateway modules.

In certain embodiments, one or more of the IoT devices 102 may also be connected via a local network (not shown here). For example, the local network may be established by a local router or a local switch. For example, the IoT device 102 may be connected to the user device 106 within a local network.

In certain embodiments, one or more of the IoT devices may communicate with a user device 106. The user device 106 may be a computer, a networked device, a mobile device, a tablet, a smartphone, or the like. The user device 106 may be an IoT device and/or contain functionality to manage one or more IoT devices, such as the group of IoT devices 102. The user device 106 may include a user interaction interface to allow a user to control an IoT device, communicate with an IoT device and/or to access data from the IoT device.

In one embodiment, the user device may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server or a hypervisor executing on a user device.

In some embodiments, the user device 108 may display application output generated by an application remotely executing on a server or other remotely located machine (for e.g., for controlling an IoT device, communicating with an IoT device and/or to accessing data from the IoT device). In these embodiments, the client device may execute a virtual machine receiver program or application to display the output in an application window, a browser, or other output window.

In certain embodiments, one or more of the IoT devices may also communicate with an IoT server 108 via the network 104. For example, a networked lighting system may communicate with a server keeping track of whether lights are on/off. The server 108 may be an IoT device and/or contain functionality to manage one or more IoT devices, such as the group of IoT devices 102. The server 108 may create an interface to allow a user to control, access data and/or to interact with the IoT devices. The IoT server 108 can be implemented as a plurality of structurally separate servers, or alternately may correspond to a single server. Optionally, the group of IoT devices 102 may be a peer-to-peer (P2P) network, i.e., they are not connected to a server and may communicate with each other directly. In a peer-to-peer network, service discovery schemes can multicast the presence of nodes, their capabilities, and group membership. The peer-to-peer devices can establish associations and subsequent interactions based on this information.

Server 108 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

The system 100 may also include a data store 112 configured to store information (e.g., profile, status, attributes, features, functions, etc.) corresponding IoT devices 102 and certain context relevant entities (e.g., people, places, groups, physical objects, brands, things, or any combination thereof). In an embodiment, the data store 112 may collect and/or probe device information (e.g., profile, status, attributes, etc.) from one or more of the IoT devices 102, user device 106, server 108, device identification engine 110, external sources (such as IoT device manufacture databases), network traffic, protocols, agents, services and techniques used by the IoT devices, a user, or the like. This information may be collected in either a single pass or multiple passes depending on performance requirements for each new device which is connected to the network 104. Alternatively or additionally, this information may be collected passively by, for example, eavesdropping to network traffic or actively by querying the devices either directly or indirectly. For example, data store may store a historical database table which stores communication parameters of past transmissions such as) protocol, latency, application latency tolerance, whether an acknowledgement was required, payload size, and transmission time) for each message sent over a network connection to and/or from a particular IoT device.

In an embodiment, the system 100 may also include a device identification engine 110 configured to identify and/or classify IoT devices 102 of the system by analyzing data corresponding to the IoT devices 102 and/or various other components of the system 100. The device identification engine 110 may be a standalone device or one of IoT devices 102, and/or the server 108. The device identification engine 110 may be a physical device, a virtual device, or a software application running on a physical device. The device identification engine 110 may include a user interface that can output information relating to the IoT devices 102 and receive input information. The device identification engine 110 may also be configured to generally observe, monitor (e.g., attributes, activities, states, etc. of the IoT devices), control, or otherwise manage various components of the system 100. The device identification engine 110 may also profile context relevant entities, such as using data analysis and methods described herein, and store these entity profiles in the data store 112 for reference.

As used herein, the term "device identification" or "device classification" refers to automatically assigning an IoT device to a device category according to available information about the IoT device. In some embodiments, a device category comprises a set of device characteristics {C1, C2, ..., Cn}, which may include, without limitation, a product category (e.g., personal computer, tablet computer, printer, smartwatch, home entertainment system, thermostat, a glucometer, a pulse monitor, a pedometer, etc.), a manufacturer (e.g., Samsung®, Nest®, Apple®, Fitbit®, etc.), a hardware model (e.g., Charge®, Charge HR®, iPad®, etc.), a functionality (e.g., health monitoring, home appliance, security system, etc.), software applications used by the IoT device, type of data transmitted by the IoT device (e.g., temperature, humidity, pressure, pulse rate, occupancy data, etc.), type of network protocol used by the IoT device to communicate, or the like. Device discovery enables tracking of the IoT devices, for example, authentication, data access permissions and security, data analysis, data correlation, rule generation, rule execution, event tracking, and/or user interface. In some embodiments, the device identification engine 102 may also detect the type and/or make of the IoT devices. The type may define the data structure of the IoT device, actions that are applicable to IoT device, and/or communication protocols and processes of the IoT device. As a specific example, correlating device features of a smart home automation light switch enables the data consolidation modules to communicate with the light switch and the interoperable rule modules to control and manage the light switch. The device identification engine 110 can simplify the connectivity process of adding a new device to an IoT network by identifying the new device completely or partially without user input.

In an embodiment, the device identification engine 110 uses a hybrid data analysis method that utilizes both rule based pattern matching and machine learning to provide higher accuracy while requiring less computing time. Device identification engine 110 receives as input a set of identification data for an IoT device, and outputs a category indicator indicative of a device type.

The term "identification data" is used broadly to include various kinds of data usable to determine the device identity or type of an IoT device, i.e., to assign the device to a category of devices, and may include, without limitation, data sent to, received by, and/or related to the IoT devices. Such data may be Boolean (e.g., indicating whether the respective device has a particular feature or not), numeric (e.g., as in a network address, a destination address, a sensor value), string (e.g., as in host names, measurement units, user query messages, and user agent fields), or the like. In one embodiment, the identification data may include real-time information from continuous or discrete data streams, non-real-time data, device sensor data, user-device interaction dataset, user reporting dataset, or any combination thereof including metadata thereof. Some exemplary identification data include:

a) Packet information. Information about data packets sent to and/or from IoT devices, such as, without limitation, packet count, byte count, first packet time, last packet time, payload information, latency, transmission time, format of information included (e.g., Boolean, text, or the like), etc. may be specific to specific types of IoT devices.

b) Network flow attributes. Different devices have different network flow attributes corresponding to network traffic transmitted and/or received by the device. For example, for an MQTT message published by an IoT device: 1) packet ID, 2) quality of service (QoS) level, 3) topic, etc. may include information about the device. Similarly, for a TCP protocol, 1) source port number, 2) destination port number, 3) IP address of the device, and 4) protocol (derived from the "protocol" field in IPv4 headers, and the "NextHeader" field in IPv6 headers) may include identification information.

c) Hardware ID indicators, such as a Media Access Control (MAC) address and/or an International Mobile Equipment Identity (IMEI) number of the respective IoT device. The MAC address is 48 bits in length, and is typically indicative of a manufacturer of the respective device. For instance, the first 24 bits of the MAC address of all Nest® devices are 18:B4:30. Combining the MAC address with knowledge of what types of devices the respective manufacturer produces (in the case of Nest®, IP cameras, thermostats and smoke detectors) may allow an efficient identification of a device type of the respective IoT device.

d) Supported communication protocols. Some devices advertise specific network services, such as Bonjour®, etc. Some such services are more frequently associated with a device type, manufacturer, etc. For instance, Bonjour® is predominantly encountered on Apple® devices.

e) DHCP parameters such as a vendor name, a fingerprint, and a hostname of the respective IoT device. The DHCP fingerprint is an array of option values that are specific for some DHCP clients. For example, '1,3,6' is common for devices from the Internet of Things (IoT) category. The DHCP vendor name comprises an identifier of the IoT device's particular DHCP implementation. For instance, 'MSFT' is a common vendor name for the Windows DHCP client. The hostname can be manually set by a user, but it often comprises a default name set by the manufacturer. Certain patterns of these default hostnames may identify the respective IoT device as belonging to a particular category of devices. For instance, default hostnames starting with the 'NP-' prefix are common to Roku® media players.

f) User agent indicators extracted from a header of a HTTP request. User agent indicators include a set of identifiers for the model, operating system or the browser/application that issued the respective request. For instance, a common pattern for browsers is "Mozilla/[version] ([system and browser information]) [platform] ([platform details])".

g) Multicast Domain Name System (mDNS) service indicators. mDNS is a zero-configuration service that resolves hostnames to IP addresses in the absence of a conventional domain name server. Several devices use mDNS to advertise a set of services and ports. Additional classification information may be obtained from the TEXT field. mDNS services are popular among Apple devices, printers, or network attached storages. For example, most printers advertise the service 'printer' over mDNS.

h) Simple Network Management Protocol (SNMP) parameters. SNMP is a network protocol for exchanging management information among connected devices. A device with a SNMP server broadcasts and OID (Object Identifier). The content of various fields can be approximately mapped to certain device types and models.

i) Network protocol parameters. Network protocols and parameters can be mapped to certain device types and models.

j) Measurement units included in the data received and/or sent by the IoT device. For example, thermostats, refrigerators, heating ventilation and air conditioning (HVAC) units, etc. will send and/or receive data that include temperature measurement units, pedometers or other fitness tracking units will send and/or receive data that include calorie, heart rate, pulse rate, etc. type measurement units, a glucometer will and/or receive data that include mass/volume measurement units, a flow control valve glucometer will and/or receive data that include volumetric flow related measurement units.

k) Content of the data received and/or sent by the IoT device. These can include, for example, location readings, temperature readings, images, videos, barometric pressure readings, and more.

In an embodiment, the device identification engine 110 may receive the identification data from one or more of the IoT devices 102, user device 106, server 108, data store 112, external sources (such as IoT device manufacture databases), network traffic, protocols, agents, services and techniques used by the IoT devices, a user, or the like. For example, the device identification engine 110 may receive the identification data directly from the IoT devices 102, via reporting from the data store 112, other components of the system, or applications corresponding to the IoT device 102. The device identification engine 110 may also extract identification data from an external source. For example, identification data may be extracted from an online or virtual data source, such as a geo-location map, a device manufacturer database, a social network, a calendar, a media network, or any combination thereof. Receiving or harvesting of the identification data may depend on a type of the respective data. For instance, device identification engine 110 may extract a user agent indicator from a HTTP request received from an IoT device. In an embodiment, device identification engine 110 may extract network flow information by sniffing data packets sent to and/or from an IoT devices using now or hereafter known methods, such as without limitation, virtual private network ("VPN"). The device identification engine 110 may intercept messages offering services and broadcast by the IoT devices to determine the kind of services and/or protocols the respective devices support. In certain embodiment, the device identification engine 110 may use a service discovery tool such as Network Mapper (NMap). In an embodiment, the device identification engine 110 may send a probe out to a particular port of an IoT device and listening for a response to harvest data about network protocols and services such as Bonjour® and SNMP or send a probe out to an MQTT broker and listening for a response to harvest data about MQTT data, or the like.

It will be understood to those skilled in the art that device identification may proceed iteratively, since not all identification data may be available at once. Some data types may be relatively easy to acquire, while others may necessitate relatively lengthy procedures, such as handshake message exchanges, negotiations on network configuration parameters, authentication, etc. During iterative device discovery, device identification engine 110 may perform a preliminary determination of a device type according to the currently available data about the respective IoT device. In response to the preliminary determination, device identification engine 110 may request further device-type-indicative data until a successful category assignment of the IoT device is achieved.

Figure 2:
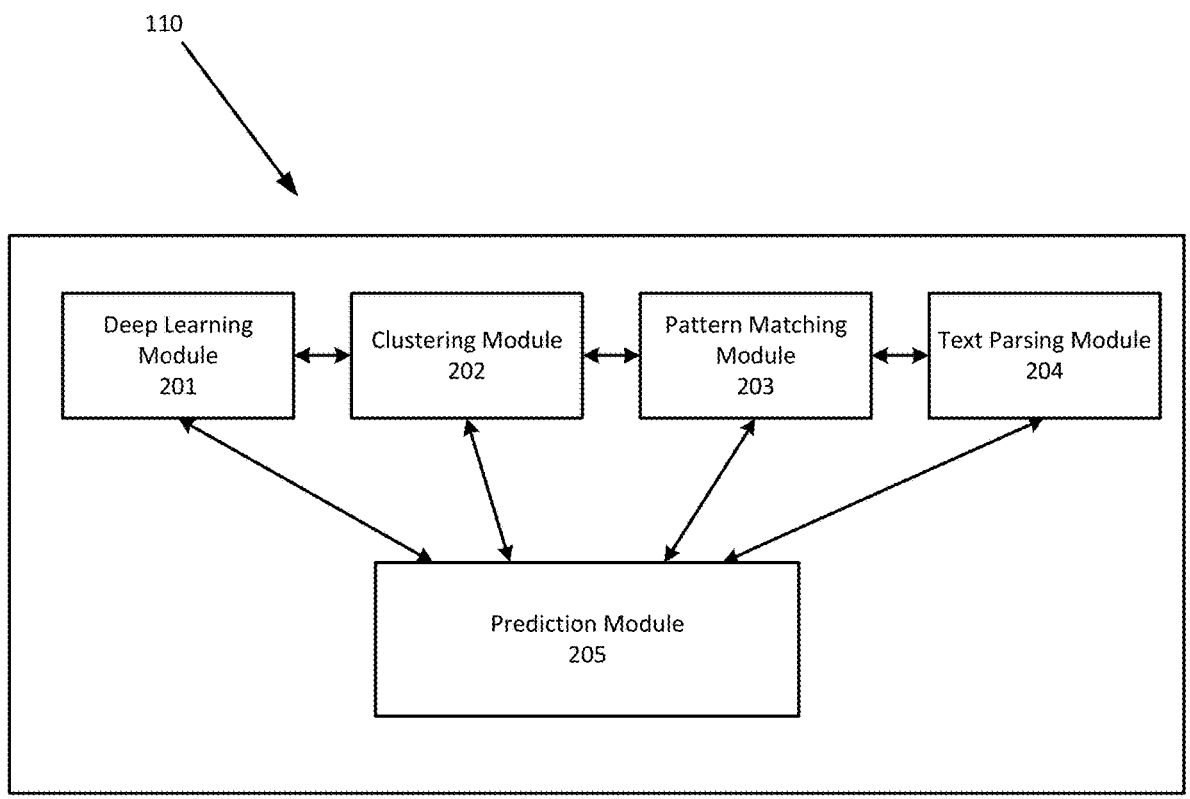
FIG. 2 illustrates an exemplary block diagram of a device identification engine that may be used in accordance with one or more illustrative aspects described herein.

FIG. 2 illustrates a schematic block diagram of various modules included in a device identification engine 110. The device identification engine 110 may include a deep learning module 201, a clustering module 202, a pattern matching module 203, a text parsing module 204, and a prediction module 205.

In an embodiment, the deep learning module utilizes deep learning to classify and/or identify an IoT device based on the identification data corresponding to the IoT device. As used herein, "deep learning" refers to a form of machine learning that utilizes multiple interconnected neural network layers along with feedback mechanisms or other methods to improve the performance of the underlying neural network. Deep Learning systems are usually based on several interconnected layers of a convolution neural network, among other layers, interconnections, or feedback mechanisms. There are many variants of neural networks with deep architecture depending on the probability specification and network architecture, including, but not limited to, Deep Belief Networks (DBN), Restricted Boltzmann Machines (RBM), a convolutional neural network (CNN), a deep neural network (DNN), a recurrent neural network (RNN)-enhanced model capable of sequential data pattern learning, and Auto-Encoders. Deep-learning models may be trained to learn representations of data using supervised and/or unsupervised learning. From a computational standpoint, the methods used in deep learning involve several mathematical calculations of matrix-to-matrix and matrix-to-vector calculations. The number and nature of these calculations makes them essentially impossible for a human to perform the calculation by-hand or by manual process, within any practical amount of time.

The deep learning module 201 may be any now or hereafter known deep learning neural network or system that enables the deep learning module 201 to identify an IoT device as described herein. In an embodiment, the deep learning module 201 may receive a training set of data that includes the first data packets (e.g., MQTT packets) published and/or received by the IoT devices of a network. The deep learning module 201 may then analyze the data packets to extract features (or characteristics) corresponding to different types of devices, and apply the extracted features to data published by new IoT devices added to the network in order to identify or classify the new IoT devices. Specifically, the deep learning module 201 may create a model that is trained to recognize the differences between data packets published by different types of devices. In an example embodiment, the deep learning module 201 may analyze the payload size (e.g., byte size) of data packets published and/or received by the devices to create the model. For example, the deep learning module 201 may create a model that is trained to recognize the differences between, for example, data sets corresponding to a glucometer, a refrigerator, a heating ventilation and air conditioning (HVAC) unit, a pulse monitor, a pedometer, or the like, based on the byte size of the data published and/or received by each device.

In using deep learning in the present disclosure, feature extraction is accomplished automatically using learning from the training data. As such, the deep learning module 201 obviates the need for feature selection by domain experts. However, since the accuracy of a deep learning system depends, at least in part, on the sequence in which training data is provided to the deep learning system, preprocessing of the training data, and selection of training data may be used to improve accuracy of the model. Selection of training data includes, for example, using domain-specific knowledge to improve performance of the machine learning system. Domain expertise, as used herein, provides a context in which a deep learning system can operate and can be used to select elements of training data, the order in which the training data is presented to the deep learning system, and certain sorts of invariances. Experts familiar with IoT devices can provide their expertise and select input training data and augmentations to that input data that are more likely to quickly train a deep learning system to provide accurate output. For example, in certain embodiments, the received training data may be labeled using types of IoT devices, by for example, a user or a domain expert. Alternatively and/or additionally, different training data sets may be created for different network or messaging protocols used by devices.

It will be understood to those skilled in the art that the deep learning model may be trained using supervised training, unsupervised training, or both. The advantage of using both supervised and unsupervised methods is because it is an effective method for correlating different types of features from multimodal data. Using both supervised and unsupervised methods is also advantageous because it enables fine tuning of unsupervised training with supervised training results. As would be recognized by one skilled in the art, supervised learning is the machine learning task of inferring a function from labeled training data. The training data consists of a set of training examples. In supervised learning, each example is a pair consisting of an input object, typically a vector, and a desired output value or target. The goal is to learn a general rule that maps inputs to outputs. A supervised method is advantageous because a supervised learning algorithm analyzes the training data and produces an inferred function, which can be used for mapping new examples. Further, as would be recognized by one skilled in the art, an unsupervised method tries to find hidden structure in unlabeled data and includes an algorithm with no target value, i.e., there is no error or reward signal to evaluate a potential solution. Instead, the algorithm has a halting criterion. Examples of halting criteria include, but are not limited to, precision, recall, accuracy, number of cycles, and time. An unsupervised method is advantageous for use in model training when the only data available is unlabeled data.

Referring back to FIG. 2, a clustering module 202 may be configured to cluster the devices by associating similar devices with a particular cluster or group such that those devices belonging to the same cluster are similar in at least some ways, and those belonging to different clusters are dissimilar in at least some ways.

In an embodiment, the clustering module 202 may cluster the devices based on a characteristic or feature set extracted from the identification data corresponding to each device. The feature set used by the clustering module 202 specifies one or more device features and a feature value for each device feature. Devices may be deemed as being similar and therefore subject to clustering in dependence on features of the device such as, for example, the type of network connection supported by the device, the communications protocols supported by the device, the manufacturer of the device, different capabilities of the device, types of data transmitted by a device, and so on. In an embodiment, the clustering module 202 may include a pre-defined set of features. The pre-defined set of features may be provided, for example, by a user, determined by the system based on one or more characteristics of the devices, selected by the system from a set of features based on one or more characteristics of the devices, or the like. The pre-defined set of features may be used using cross-validation techniques now or hereafter known to those skilled in the art. The clustering module 202 may use any now or hereafter known clustering algorithms such as, without limitation, k-means, spectral, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density), or the like.

In an embodiment, the clustering module 202 may receive feedback from a user and/or device identity service for identifying the centroid of various device clusters, and may cluster the devices such that the devices in each cluster are similar to the identified device, i.e., they have similar features. The feedback in part includes identity of at least one device in each cluster. The clustering module 202 may adjust the device clusters based on the feedback from the user and/or device identity service. For example, the clustering module 202 may prompt a user to identify at least one device in each cluster, and the identification may be used as a label for the cluster. For example, (i) a user may identify a motion sensor in a cluster of home security devices created by the clustering module 202 based on similarity of features (example features include, without limitation, data packets including alerts for sounding an alarm, location of the IoT devices in a home, network connectivity to an emergency service, etc.), (ii) a user may identify a glucometer in a cluster including health monitoring devices created by the clustering module 202 based on similarity of features (example features include, without limitation, data packets including measurement units that correspond with biological measurements, location of the IoT devices on the body of a user, network connectivity to a medical service provider, etc.), (iii) a user may identify a thermostat in a cluster of home automation devices created by the clustering module 202 based on similarity of features (example features include, without limitation, data packets including measurement units that correspond with home automation such as temperature, data packets including user commands to turn on/off appliances, location of the IoT devices in a home, network connectivity to a user devices such as mobile phones, etc.), (iv) a user may identify a pedometer in a cluster of fitness devices created by the clustering module 202 based on similarity of features (example features include, without limitation, data packets including measurement units that correspond with fitness such as calories, heart rate, etc.; location of the IoT devices on a user's body, network connectivity to a user devices such as mobile phones, connectivity to a global positioning service, etc.).

In an embodiment, the clusters may be redefined to improve clustering accuracy iteratively based on learning new data and/or user input. For example, the clustering module 202 may cluster all devices receiving and/or transmitting temperature data in one cluster initially, and then may refine the clustering by sub dividing the initial cluster into, for example, a low temperature device cluster (e.g., refrigerators, air conditioners, etc.) and a high temperature device cluster (e.g., furnace, coffee maker, microwave, etc.).

In an embodiment, the clustering module may assume all features to be equally important while performing the clustering. Alternatively, the clustering module may assign different weights to different features while clustering and/or change the value of the weights iteratively based on learning.

Referring back to FIG. 2, a pattern matching module 203 may identify or classify devices based on a static rule set or a reference table derived from the knowledge of protocols or network parameters supported by different devices. In this context, a protocol consists of a set of rules defining how an IoT device interacts with other devices or components of the system. For example, in an MQTT based deployment of IoT devices, pattern matching module 203 assumes that devices publishing similar messages and/or devices subscribing to similar messages are likely similar or identical devices. The pattern matching module 203 may analyze the network protocols or parameters used by an IoT device added to the network, and use the reference table as look up table to identify or classify the IoT device. In one embodiment, the pattern matching module 203 may generate a confidence score by comparing the parameters of an IoT device to those stored in the reference table. In an embodiment, the pattern matching module 203 may create the reference table using information about various IoT devices obtained from, for example, a user, the data store 112, external sources (such as manufacturer, etc.), or the like.

The device identification engine also includes a text parsing module 204 configured to extract information from messages transmitted by and/or to various IoT devices, and use the information to identify the IoT devices. In an embodiment, the text parsing module 204 may use any now or hereafter known methods to extract information from the messages. For example, if a device is publishing MQTT messages in JSON format, then now or hereafter known JSON parsing methods can be used to extract information from the published messages. For example, the text parsing module may extract and analyze the values and/or measurement units corresponding to temperature data being transmitted by and/or IoT devices that include a refrigerator, an air conditioner, and a furnace to differentiate between the devices. For example, in a typical home automation scenario, temperature data corresponding to a refrigerator will have a value range of 0-26° F., temperature data corresponding to an air conditioned will have a value range of about 50-70° F., and temperature data corresponding to an air conditioned will have a value range of about 50-70° F. Similarly, measurement units corresponding to temperature data published by a furnace, will be different from, for example, humidity data published by a humidifier, and hence the measurement units may be used to differentiate between the devices.

Referring back to FIG. 2, a prediction module 205 receives output corresponding to device identification from the deep learning module 201, the clustering module 202, the pattern matching module 203, and the text parsing module 204, and performs a weighted polling to output a final device identification (discussed below in detail).

Referring back to FIG. 1, servers, devices and/or applications discussed above may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. Each component of FIG. 1 may be any type of known computer, server, or data processing device, discussed below in detail with respect to FIG. 3.

Figure 3:
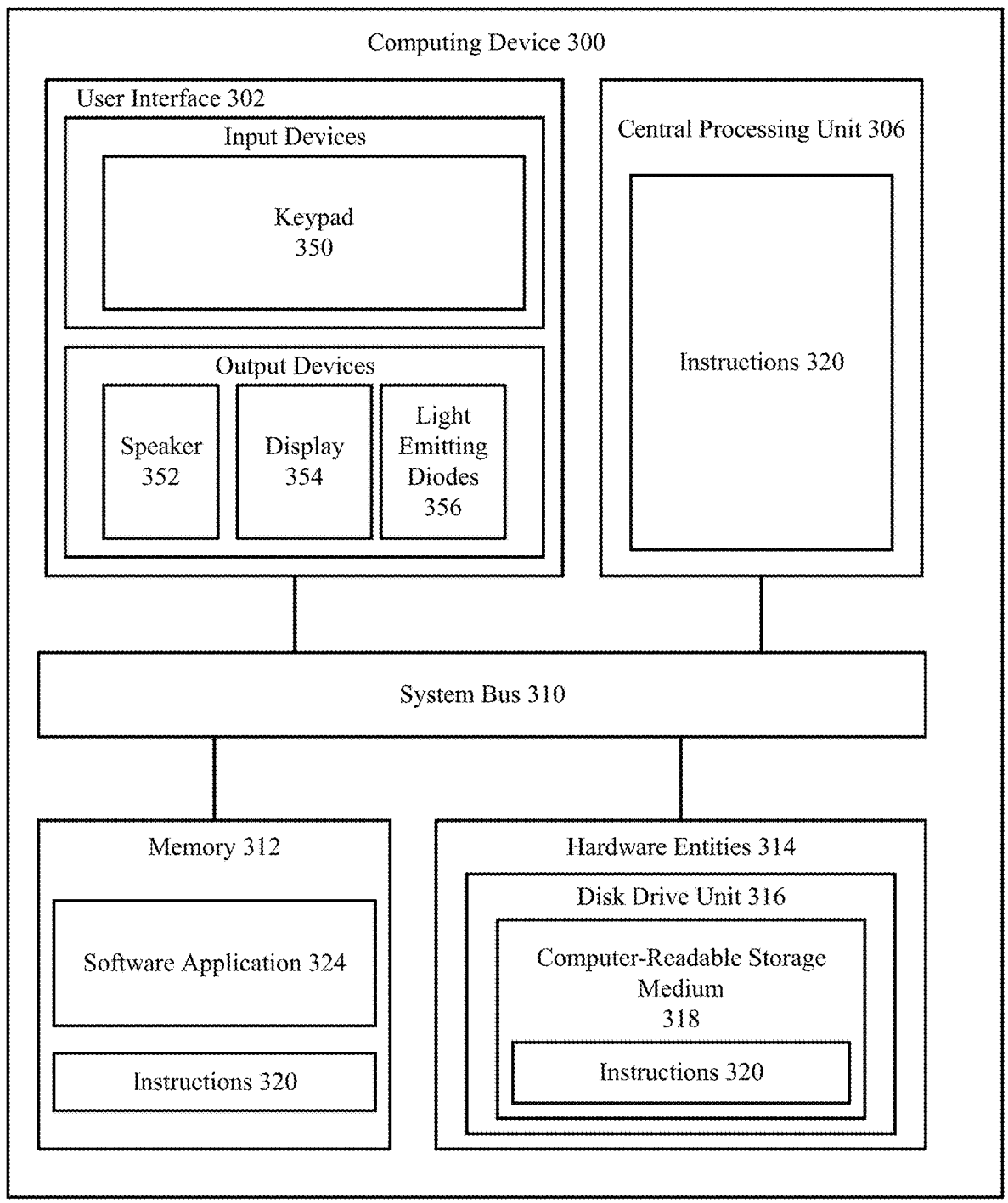
FIG. 3 illustrates block diagram of an exemplary architecture for a computing device in accordance with one or more illustrative aspects described herein.

An exemplary operating environment in which embodiments of the present invention may be implemented is described below in order to provide a general context for various aspects of the present disclosure. Referring initially to FIG. 3 in particular, an exemplary operating environment for implementing embodiments of the present invention is shown and designated generally as computing device 300. It will be understood to those skilled in the art that external appearances and/or internal components can differ significantly among IoT devices, and IoT device may include more or less components than those shown in FIG. 3.

Referring now to FIG. 3, there is provided a detailed block diagram of an exemplary architecture for a computing device 300, in which the present invention may be implemented, deployed as and/or executed on any embodiment of the computing device 300. As such, the following discussion of computing device 300 is sufficient for understanding for the implementation of the architecture 100 of FIG. 1. The computing device 300 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, virtual machines, distributed computing environments that include any of the above systems or devices, and the like.

Computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate device discovery in an IoT network. As such, the computing device 300 of FIG. 3 implements at least a portion of a method for embedding secret data in a dynamic remote session display, as discussed below.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 313 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions for execution by the computing device 300 and that cause the computing device 300 to perform any one or more of the methodologies, as described herein.

Computing device 300 may also include a communications interface for facilitating communicates with other components of the system through a network, and may provide a wired communication interface and/or a wireless communication interface. Furthermore, the communication interface may be a passive communication interface (passive IoT devices) and/or an active communication interface (active IoT devices). In one embodiment, the network interface 360 may include, by way of non-limiting example, a short-range wireless communication interface such as a Bluetooth interface.

In some scenarios, the hardware entities 314 include an electronic circuit (e.g., a processor) programmed for facilitating method for device discovery in an IoT network, as discussed below. In this regard, it should be understood that the electronic circuit can access and run a software application 324 installed on the computing device 300. The functions of the software application 324 will become apparent as the discussion progresses.

In one embodiment, a computing device 300 can be a virtual machine. The virtual machine can be any virtual machine, while in some embodiments the virtual machine can be any virtual machine managed by a hypervisor developed by Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

Figure 4:
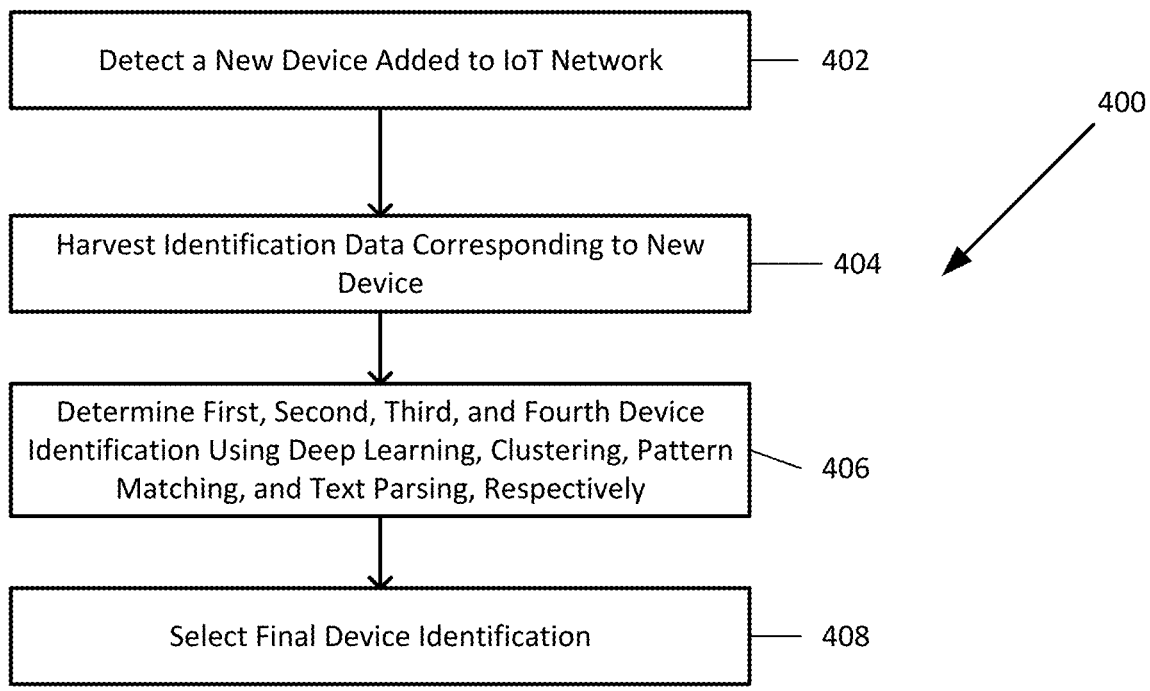
FIG. 4 a flowchart illustrating an example method for identifying an IoT device of a network in accordance with one or more illustrative aspects described herein.

Referring now to FIG. 4, an example method 400 for device discovery in an IoT network environment is illustrated. An example network environment 100 is illustrated in FIG. 1. In one or more embodiments, the process 400 illustrated in FIG. 4 and/or one or more steps thereof may be performed by a computing device (e.g., any device of FIG. 1). In other embodiments, the process illustrated in FIG. 4 and/or one or more steps thereof may be embodied in computer-executable instructions that are stored in a computer-readable medium, such as a non-transitory computer-readable memory. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, or the steps may be performed in the order disclosed or in an alternate order.

The method 400 may begin at 402 when the system detects that a new device has been added to an IoT network, and needs to be identified. It should be noted that before performing the device identification for a new device, the system must create the machine models and pattern matching rulesets included in the device discovery engine (i.e., for the deep learning module, the clustering module, the pattern matching module, and the text parsing module) by analyzing identification data (and/or user input) corresponding to an initial threshold number of devices of the IoT network.

To identify the new device, at 404, the system may harvest identification data corresponding to the new device by, for example, monitoring data sent to and/or from the device (as discussed above).

At 406, the system may determine first, second, third, and fourth device identification using deep learning, clustering, pattern matching, and text parsing, respectively. The system may determine the first, second, third, and fourth device identifications by providing the identification data as input to the deep leaning module, the clustering module, the pattern matching module, and the text parsing module, and may receive outputs from each module indicative of the device identification or type (as discussed above with respect to FIG. 2).

At 408, the system may select a final device identification from amongst the identifications provided by the four modules. In an embodiment, the prediction module may perform a weighted polling to select the final device identification from amongst the identifications provided by the four modules.

In an embodiment, for performing the weighted polling, the prediction module may assign a weight to the output of each module, i.e., the deep leaning module, the clustering module, the pattern matching module, and the text parsing module. The prediction module may initially assign a static value to the weights corresponding to the outputs of each module. The initial static value may be the same for all outputs (e.g., 1) and/or different. The prediction module may then update the weight values iteratively based on learning over a course of time and/or using cross validation. For example, for each correct prediction from a module (i.e., the output from a module matches that of the prediction module and/or actual device identification based on user input), the weight value associated with that module may be increased, and for each wrong prediction from a module (i.e., the output from a module does not match that of the prediction module and/or actual device identification based on user input), the weight value associated with that module may be decreased.

The prediction module may first initialize a probability vector $c[Dn]_i$ for each new device identification determined by one of the modules of the system (where "n" denotes the type of device) and assign the probability vector an initial value "0". For example, if the system has determined 3 device identifications corresponding to the newly detected device: D1, D2, and D3, the system will initialize 3 probability vectors $c[D1]_i$, $c[D2]_i$, and $c[D3]_i$ corresponding to device types D1, D2, and D3, respectively, and will assign each an initial value "0".

The prediction module may update the probability vector as follows:

$c[Dn]=c[Dn]_i+\Sigma W(Tj))$, where $W(Tj)$ is the weight associated with the modules Tj (i.e., the deep leaning module $W(T1)$, the clustering module $W(T2)$, the pattern matching module $W(T3)$, or the text parsing module $W(T4)$) that returned the device identification as Dn. The system only updates the chance vector for a device type using the weight value for a module if the module returns the device identification corresponding to that device type.

For example, if the deep learning module identified the new device as D1, the clustering module identified the new device as D2, the pattern matching module identified the new device as D3, and the text parsing identified the device as D1:

$c[D1]=c[D1]_i+W(T1)+W(T4)$ $c[D2]=c[D2]_i+W(T2)$ $c[D3]=c[D3]_i+W(T3)$

The prediction module may the select a final device identification from amongst the identifications provided by the four modules as the device identification that corresponds to the maximum c[Dn]. Hence, in the above examples, the system compare the values of c[D1], c[D2], and c[D3], and selects the device identification from amongst D1, D2, and D3, as the one that has the maximum value chance vector.

The system may also update the weights associated with each method Tj based on the final device identification. For example, the system may reduce the weights associated with the the deep leaning module W(T1), the clustering module W(T2), and the text parsing module W(T4), and may increase the weight associated with the pattern matching module W(T3) if the new device is determined to be D4 in the above example.

In an embodiment,

It should be noted that various components of the device identification engine 110: the deep learning module 201, the clustering module 202, the pattern matching module 202, the text parsing module 204, and the prediction module 205 may each be a continuously learning system (as is known to those skilled in the art) that takes feedback from other modules and/or users of the device identification engine 110, and improve identification accuracy over time. As such, device identification corresponding to a previously identified device may change on account of improved accuracy of one or more modules of the device identification engine 110.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either software application or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for identifying a device in an internet of things (IoT) network, the method comprising, by a processor:
  detecting that a new device has been added to the IoT network, wherein the IoT network comprises a plurality of devices;
  receiving identification data corresponding to the new device;
  determining a first device identification by analyzing the identification data using a deep learning algorithm of a plurality of algorithms;
  determining a second device identification by analyzing the identification data using a clustering algorithm of the plurality of algorithms;
  determining a third device identification based on a reference table in accordance with a pattern matching algorithm of the plurality of algorithms;
  determining a fourth device identification by analyzing one or more values included in the identification data in accordance with an information extraction algorithm of the plurality of algorithms; and
  selecting, at least one of the first device identification, the second device identification, the third device identification, and the fourth device identification as a final device identification based on a maximum chance vector that has a greatest value from amongst a plurality of chance vectors, where each of the chance vectors is a function of (i) a probability vector for a given device identification of the first, second, third and fourth device identifications, and (ii) at least one weight value that is assigned to a respective one of the plurality of algorithms that returned the given device identification.

2. The method of claim 1, wherein the first device identification is determined by:
  training a deep neural network using a training data set, wherein the training data set comprises information extracted from data packets received or published by the plurality of devices;
  extracting, from the identification data, information corresponding to the data packets received or published by the new device; and
  determining the first device identification by inputting the information corresponding to the data packets received or published by the new device into the trained deep neural network.

3. The method of claim 2, wherein the information included in the training data set comprises payload size information corresponding to the data packets received or published by the plurality of devices.

4. The method of claim 2, wherein the training data set comprises one or more subsets of training data corresponding to one or more messaging protocols used by the plurality of IoT devices for receiving or publishing data packets.

5. The method of claim 1, wherein the second device identification is determined by:
  clustering the plurality of devices into one or more clusters, wherein devices included in each of the one or more clusters have a plurality of similar features;

extracting from the identification data, one or more features corresponding to the new device; and
using the extracted one or more features to assign the new device to at least one of the one or more clusters.

6. The method of claim 5, wherein the plurality of devices are clustered into one or more clusters by:
receiving, from a user, device identification corresponding to at least one device in each of the one or more clusters; and
using the received device identification to label that cluster.

7. The method of claim 5, wherein the plurality of devices are clustered into one or more clusters by analyzing a plurality of features corresponding to the plurality of devices, wherein the features are selected from one or more of the following: a type of network connection supported by each device, a type of communications protocol supported by each device, a manufacturer of each device, one or more capabilities of each device, or types of data transmitted by each device.

8. The method of claim 1, wherein:
the reference table comprises information about one or more protocol parameters corresponding to a plurality of IoT devices; and
the third device identification is determined by extracting at least one protocol parameter corresponding to the new device for finding a match in the reference table.

9. The method of claim 1, wherein the fourth device identification is determined by:
parsing information included in a plurality of data packets received or published by the new device to determine at least one measurement unit included corresponding to the new device; and
analyzing the at least one measurement unit to determine the fourth device identification.

10. The method of claim 1, wherein:
the at least one weight value is updated based on the final device identification, prior to when a next final device identification is determined.

11. The method of claim 10, wherein the at least one weight value is increased when the given device identification is associated with the greatest value of the maximum chance vector and decreased when the given device identification is not associated with the greatest value of the maximum chance vector.

12. A system for identifying a device in an internet of things (IoT) network, the system comprising:
a plurality of devices;
a processor; and
a non-transitory computer-readable storage medium comprising programming instructions that are configured to cause the processor to:
detect that a new device has been added to the IoT network,
receive identification data corresponding to the new device,
determine a first device identification by analyzing the identification data using a deep learning algorithm of a plurality of algorithms,
determine a second device identification by analyzing the identification data using a clustering algorithm of the plurality of algorithms,
determine a third device identification based on a reference table in accordance with a pattern matching algorithm of the plurality of algorithms,
determine a fourth device identification by analyzing one or more values included in the identification data in accordance with an information extraction algorithm of the plurality of algorithms, and
select, at least one of the first device identification, the second device identification, the third device identification, or the fourth device identification as a final device identification based on a maximum chance vector that has a greatest value from amongst a plurality of chance vectors, where each of the chance vectors is a function of (i) a probability vector for a given device identification of the first, second, third and fourth device identifications, and (ii) at least one weight value that is assigned to a respective one of the plurality of algorithms that returned the given device identification.

13. The system of claim 12, wherein the programming instruction that cause the processor to determine the first device identification by analyzing the identification data using the deep learning algorithm comprise instructions to:
train a deep neural network using a training data set, wherein the training data set comprises information extracted from data packets received or published by the plurality of devices;
extract, from the identification data, information corresponding to data packets received or published by the new device; and
determine the first device identification by inputting the information corresponding to data packets received or published by the new device into the trained deep neural network.

14. The system of claim 13, wherein the information included in the training data set comprises payload size information corresponding to the data packets received or published by the plurality of devices.

15. The system of claim 13, wherein the training data set comprises one or more subsets of training data corresponding to one or more messaging protocols used by the plurality of IoT devices for receiving or publishing data packets.

16. The system of claim 12, wherein the programming instruction that cause the processor to determine the second device identification by analyzing the identification data using the clustering algorithm comprise instructions to:
cluster the plurality of devices into one or more clusters, wherein devices included in each of the one or more clusters have a plurality of similar features;
extract from the identification data, one or more features corresponding to the new device; and
use the extracted one or more features to assign the new device to at least one of the one or more clusters.

17. The system of claim 16, wherein the programming instruction that cause the processor to cluster the plurality of devices into one or more clusters further comprise instructions to:
receive, from a user, device identification corresponding to at least one device in each of the one or more clusters; and
use the received device identification to label that cluster.

18. The system of claim 16, wherein the programming instruction that cause the processor to cluster the plurality of devices into one or more clusters further comprise instructions to perform the clustering by analyzing a plurality of features corresponding to the plurality of devices, wherein the features are selected from one or more of the following: a type of network connection supported by each device, a type of communications protocol supported by each device, a manufacturer of each device, one or more capabilities of each device, or types of data transmitted by each device.

19. The system of claim 12, wherein:
the reference table comprises information about one or more protocol parameters corresponding to a plurality of IoT devices; and
the programming instructions that cause the processor to determine the third device identification based on the reference table comprise instructions to extract at least one protocol parameter corresponding to the new device for finding a match in the reference table.

20. The system of claim 12, wherein the programming instruction that cause the processor to determine the fourth device identification by analyzing one or more values included in the identification data comprise instructions to:
parse information included in a plurality of data packets received or published by the new device to determine at least one measurement unit included corresponding to the new device; and
analyze the at least one measurement unit to determine the fourth device identification.

21. The system of claim 12, wherein the at least one weight value is updated based on the final device identification, prior to when a next final device identification is determined.

22. The system of claim 21, wherein the at least one weight value is increased when the given device identification is associated with the greatest value of the maximum chance vector and decreased when the given device identification is not associated with the greatest value of the maximum chance vector.

* * * * *